United States Patent [19]

Kellner

[11] 4,276,787
[45] Jul. 7, 1981

[54] STEERING DEVICE FOR A CYCLE

[76] Inventor: Andrew Kellner, 92 Cardigan St., Stanmore, New South Wales 2048, Australia

[21] Appl. No.: 61,342

[22] Filed: Jul. 27, 1979

[30] Foreign Application Priority Data

Aug. 23, 1978 [AU] Australia ............................. PD5638

[51] Int. Cl.³ ...................... B62K 21/00; B62K 21/12; B62K 21/16
[52] U.S. Cl. ......................................... 74/552; 74/493
[58] Field of Search ............. 74/492, 493, 552, 551.1, 74/551.8

[56] References Cited

U.S. PATENT DOCUMENTS

| 1,130,933 | 3/1915 | Rupert | 74/552 X |
|---|---|---|---|
| 1,403,968 | 1/1922 | Pierre | 74/552 |
| 1,433,522 | 10/1922 | Angsten | 74/552 |
| 2,863,015 | 12/1958 | Ahrens | 74/552 X |
| 3,336,817 | 8/1967 | Madden, Jr. | 74/552 |
| 3,529,490 | 9/1970 | Pawsat et al. | 74/551.8 X |
| 3,530,738 | 9/1970 | Kerr | 74/552 X |
| 3,533,305 | 10/1970 | Hill | 74/552 X |

FOREIGN PATENT DOCUMENTS 780564  2/1935  France ...................................... 74/552

*Primary Examiner*—Allan D. Herrmann
*Attorney, Agent, or Firm*—Ladas & Parry

[57] ABSTRACT

A steering arrangement for a bicycle having a steering shaft, said arrangement comprising a steering wheel, a generally "U" shaped member extending from said wheel for the securing of the wheel to said shaft and a clamp to adjustably clamp said "U" shaped member to said shaft so that said steering wheel may be adjusted relative to a rider of the cycle.

4 Claims, 3 Drawing Figures

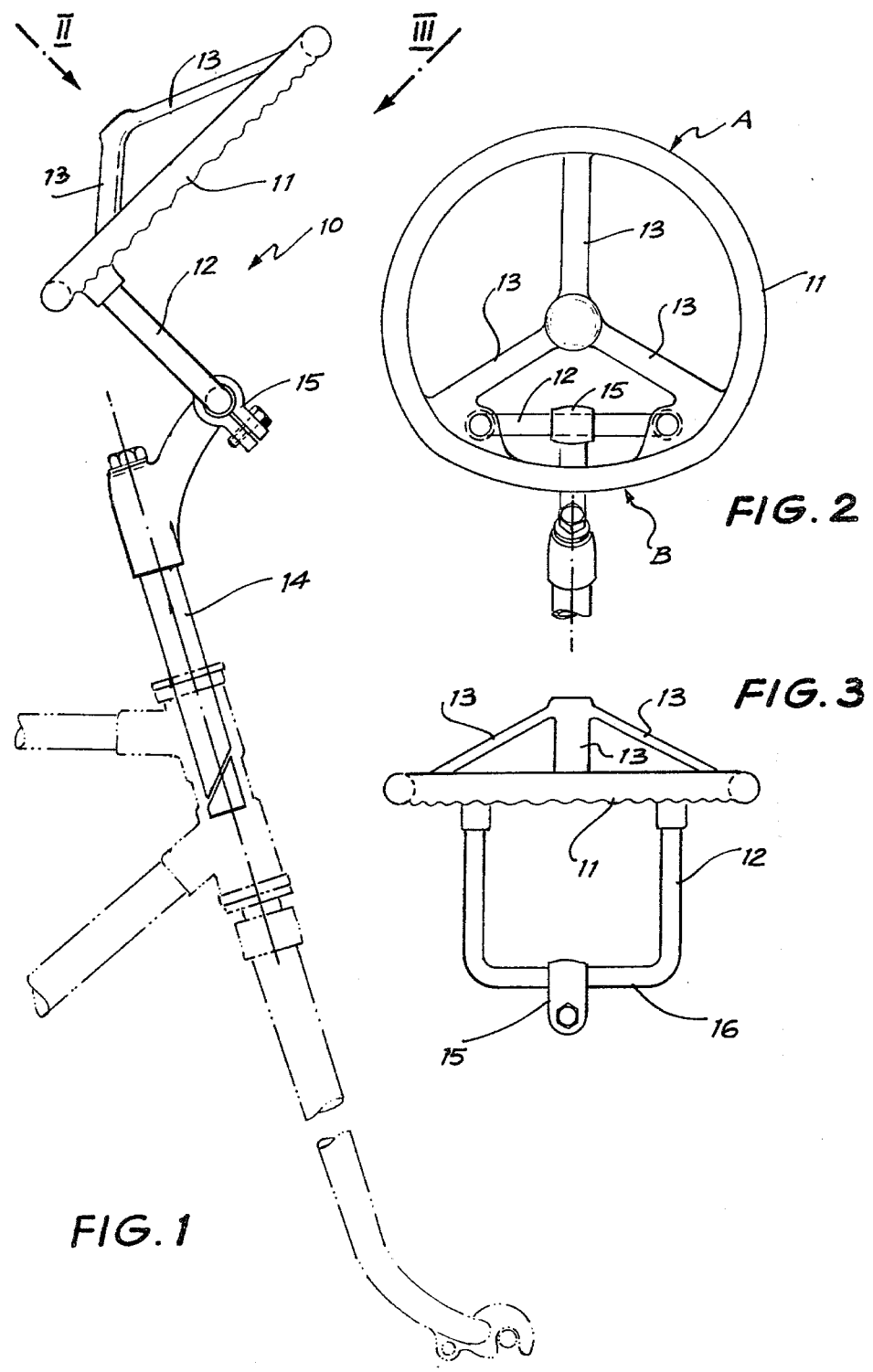

STEERING DEVICE FOR A CYCLE

The present invention relates to bicycles and motorcycles and more particularly to a steering device for cycles.

Conventional bicycles have been provided with steering bars which are limited in their adjustment to suit the varied needs of different individuals, while additionally the use of such steering bars in generally uncomfortable in that the rider of the cycle must be in a rather uncomfortable position to be able to move the bar through its required range to steer the bicycle effectively.

It is the object of the present invention to overcome or substantially ameliorate the above disadvantages.

There is disclosed herein a steering arrangement for a bicycle having a steering shaft, said arrangement comprising a steering wheel, a generally "U" shaped member extending from said wheel for the securing of the wheel to said shaft, and a clamp to adjustably clamp said "U" shaped member to said shaft so that said steering wheel may be adjusted relative to a rider of the cycle.

With the steering arrangement of the above described form it is possible to grip the wheel in any number of positions, whichever is most comfortable. Additionally, the wheel has novelty appeal particularly to children.

A preferred form of the present invention will now be described by way of example with reference to the accompanying drawings in which:

FIG. 1 is a side elevation of a steering device for a bicycle;

FIG. 2 is a plan view of the steering wheel of the device of FIG. 1 viewed in the direction II; and FIG. 3 is a side elevation of the steering wheel of the device of FIG. 1 viewed in the direction III.

The steering device 10 comprises a steering wheel 11 adapted to be gripped by a cyclist, and spoke members 13 which as an alternative may be gripped by the cyclist to steer the cycle. The spoke members 13 extend upwardly from the plane of the wheel 11. Extending downwardly from the wheel 11 is a generally "U" shaped member 12 to provide for the coupling of the wheel 11 to the steering shaft 14, which is of conventional form, via clamp 15. The "U" shaped member 12 extends generally normal to the plane of the wheel 11.

The wheel 11 is composed of two portions A and B. Portion A defines generally a portion of the circumference of a circle while portion B defines generally a cord of that circle although portion B is slightly curved. Also portion B extends between two spoke members 13. The wheel 11 is of this configuration so as not to extend too closely to the rider of the cycle to thereby inhibit his movements in manoeuvring the bicycle.

Due to the clamp 15 the "U" shaped member 13 may be located either adjacent or remote with respect to the rider to provide for adjustment in positioning the wheel 11 with respect to the rider. This is accomplished by relocating the member 12 in clamp 15 so that the wheel 11 extends downward from member 12 rather than upward as presently depicted. It is further possible to adjust the location of the wheel 11 so as to be inclined to the shaft 14 at any desired angle to enable the wheel 13 to be located in the most desirable position. This adjustment is provided by rotation of the bottom portion 16 of the member 12 in the clamp 15.

Thus from the above it is apparent that the wheel 11 may be located in an infinite number of positions. Thus it is possible for the wheel 11 to be located to suit any cyclist.

Additionally control devices such as a brake or accelerator lever (in the case of a motorcycle), may be adjustably moved to desired location on the wheel 11 to still further provide for the comfort of the cyclist.

What I claim is:

1. A steering arrangement for a bicycle having a steering shaft, said arrangement comprising:
   (a) a steering wheel consisting of a first section defining a portion of the circumference of a circle and a second part generally defining a cord of said circle, with said second part subtending an angle with respect to said circle which is smaller than the angle subtended by said first part;
   (b) a generally U-shaped member attached at its extremities to said wheel at spaced locations adjacent the juncture of said first and second parts of said wheel, and extending from the general plane of the wheel to enable attachment of said member to said shaft; and
   (c) a clamp to adjustably attach said member to said shaft to enable pivoting of said wheel about an axis transverse of the bicycle.

2. The arrangement of claim 1 wherein said wheel has spokes which extend outwardly from the plane of the wheel.

3. The arrangement of claim 2 wherein said "U" shaped member extends generally normal to the plane of the wheel.

4. The arrangement of claim 2 or 3 wherein said clamp frictionally engages said "U" shaped member to secure in a desired location.

* * * * *